US007520072B2

(12) United States Patent  (10) Patent No.: US 7,520,072 B2
Yu  (45) Date of Patent: Apr. 21, 2009

(54) EXIT SIGNS WITH AND WITHOUT EMERGENCY LIGHTING

(76) Inventor: William Yu, 25121 Vista Ridge, Laytonsville, MD (US) 20882-3701

(*) Notice: Subject to any disclaimer, the term of this patent is extended or adjusted under 35 U.S.C. 154(b) by 20 days.

(21) Appl. No.: 11/798,033

(22) Filed: May 9, 2007

(65) Prior Publication Data

US 2008/0276509 A1 Nov. 13, 2008

(51) Int. Cl.
*G09F 13/04* (2006.01)
(52) U.S. Cl. .............................. 40/570; 362/20; 307/66; 315/86
(58) Field of Classification Search ................... 40/570, 40/553; 362/20, 555; 307/66; 315/86
See application file for complete search history.

(56) References Cited

U.S. PATENT DOCUMENTS

| 3,931,689 | A | * | 1/1976 | Shine ........................... 40/570 |
| 4,682,147 | A | * | 7/1987 | Bowman ................ 340/815.45 |
| 5,030,890 | A | | 7/1991 | Johnson |
| 5,428,912 | A | | 7/1995 | Grondal et al. |
| 5,446,440 | A | | 8/1995 | Gleason et al. |
| 5,526,251 | A | | 6/1996 | Andre et al. |
| 5,542,201 | A | | 8/1996 | Grondal et al. |
| 5,656,925 | A | | 8/1997 | Schie et al. |
| 5,797,673 | A | | 8/1998 | Logan et al. |
| 5,946,837 | A | | 9/1999 | Ackers et al. |
| 5,954,423 | A | * | 9/1999 | Logan et al. ................. 362/235 |
| 5,988,825 | A | * | 11/1999 | Masters et al. ................ 362/20 |
| 6,106,126 | A | | 8/2000 | Neustadt |
| 6,142,648 | A | | 11/2000 | Logan et al. |
| 6,152,581 | A | | 11/2000 | Masters et al. |
| D446,818 | S | | 8/2001 | Kim |
| 6,499,866 | B1 | | 12/2002 | Logan et al. |
| 6,663,248 | B2 | * | 12/2003 | Hsieh ........................... 362/20 |
| 6,824,295 | B1 | * | 11/2004 | Grondal ....................... 362/234 |
| 6,848,798 | B1 | | 2/2005 | Logan et al. |
| D504,705 | S | | 5/2005 | Gregory et al. |
| 7,114,840 | B2 | | 10/2006 | Hamrick |
| 2001/0045035 | A1 | * | 11/2001 | Katz ............................ 40/570 |
| 2006/0215403 | A1 | * | 9/2006 | Martineau .................... 362/240 |
| 2007/0096663 | A1 | * | 5/2007 | Wong et al. ................. 315/312 |

OTHER PUBLICATIONS

Model EZXTE LED Exit Sign, BEST Lighting Products, printout from www.bestlighting.net/exit/EZXTE.htm dated Nov. 6, 2006.
Combo Jr. LED Exit Emergency Light, BEST Lighting Products, printout from www.bestlighting.net/exit/CJTE.htm dated Nov. 6, 2006.
Emergency Lighting Units Model R-1, BEST Lighting Products, printout from www.bestlighting.net/emerg/index.htm dated Nov. 6, 2006.
Exit Signs Model CXTE, BEST Lighting PRoducts, printout from www.bestlighting.net/exit/CXTE.htm dated Nov. 6, 2006.

* cited by examiner

*Primary Examiner*—Gary C Hoge
(74) *Attorney, Agent, or Firm*—Dowell & Dowell, P.C.

(57) ABSTRACT

Emergency signs and combination emergency signs and emergency lights wherein the combination signs are compact for shipment and are energy efficient using first interior light emitting diodes, powered by an AC power source, for illumination of messages formed in at least one side wall of the emergency signs and having at least one emergency light emitting diode lamp for providing emergency lighting in the event of AC power failure and wherein the at least one emergency light emitting diode lamp, in some embodiments, is selectively deployable and adjustable relative to the signs, and in others, is fixedly mounted relative to the signs.

20 Claims, 19 Drawing Sheets

EXIT SIGNS WITH AND WITHOUT EMERGENCY LIGHTING

BACKGROUND OF THE INVENTION

1. Field of the Invention

This invention is directed to the field of illuminated emergency exit signs and emergency exit lights and more particularly to such signs and lights that are illuminated by light emitting diodes (LEDs) operating at very low and efficient power levels such that their use results in substantial energy savings over the operational lives thereof. In the preferred embodiments, the emergency exit signs include LED emergency lamps that may be fixed or adjustably mounted to the housings of the exit signs so as to provide illumination to light exit passageways in the event of an AC power outage. The invention is further directed to a unique capacitance circuitry for powering the message illuminating LEDs of exit signs in series with one another and with a charging circuit for backup batteries contained within the housings of the signs when the exit signs are power by an AC power source and wherein, when the AC power is interrupted, the message illuminating LEDs, and any emergency illuminating LEDs used in combination therewith, are powered in parallel circuits by the backup batteries.

2. Description of the Related Art

The use of emergency exit signs to mark routes to exit buildings is generally mandated by government agencies for safety reasons. Conventional emergency exit signs are hard wired to the AC power source within a building so as to be continuously illuminated. In the event of a power outage, batteries are provided within the signs which supply power to the lights mounted therein that illuminate one or more message panels defined by walls of the sign housing. Such panels may have translucent areas that provide an emergency message, such as "EXIT".

Government agencies have also mandated that, in addition to the marking of exit passages, emergency lighting be automatically activated to illuminate emergency passageways in the event of a power failure that disrupts power to the interior lighting within a building. Conventionally, emergency lighting is provided by independent light sources, such as one or two flood or spot type incandescent bulbs that are associated with a wall mounted housing in which batteries are contained for powering the lights whenever the AC power within a building is interrupted. The emergency lighting units also include sensing and control circuits for activating the emergency lights whenever the AC power is terminated and charging circuits for supplying power to charge the batteries whenever the AC power is active.

To become more efficient and to reduce costs associated with the need to provide both emergency signs and emergency exit lighting, combination emergency exit signs and emergency exit lights have been developed wherein the emergency lights are mounted to the exterior of an exit sign. Such combination signs and lights are described in U.S. Pat. Nos. 5,797,673, 6,142,648 and 6,8487,798 to Logan et al. The combination signs and emergency lights require only one housing to be mounted to a wall or ceiling and only a single connection to be made to the electrical power circuit within a building, thereby reducing installation time and costs. However, exit signs and emergency light combinations using incandescent lights are rather large and bulky and are not energy efficient.

With the advent of lower power light sources, such as light emitting diodes (LEDs), and better battery construction, such as light weight and longer lasting nickel cadmium (NiCd) batteries, more efficient combination emergency exit and emergency lights have been developed. Because LEDs are much smaller than conventional incandescent or fluorescent lights, the LED combination signs and emergency lighting units can be more compactly contained in more esthetically pleasing housings which are also lighter in weight. Also, as the LEDs operate at much lower power levels, such as from 1 to 8 watts, when compared to more conventionally illuminated signs, the cost for powering the signs is significantly reduced. Another benefit obtained by using LED illumination in emergency signs is that the operating life of an LED is significantly greater than for conventional incandescent or fluorescent lights. Because emergency signs and emergency illumination are needed in so many places, the energy savings that can be achieved through the use of LED technology, should mandate the use of LEDs in all new installations.

In some combination signs, as is taught in U.S. Pat. No. 5,446,440 to Gleason et al, LEDs are mounted within a primary housing of the sign. A first number of the LEDs is used to illuminate the emergency message while separate LEDs are aligned with openings provided in the lower wall of the housing through which the light from the separate LEDs may be directed or reflected to provide emergency lighting. In other LED combination signs, the LEDs may be mounted to an outer portion of the sign housing such as disclosed in U.S. Pat. No. 7,114,840 to Hamrick.

Even in view of the significant improvement LEDs have brought to the field of emergency signs and lighting, there remains a need to further enhance the efficiency of such signs and lighting so as to make installation easier, to provide for reductions in manufacturing costs, to enhance the styling and compactness of such signs and lighting and to further provide greater efficiency in energy savings.

SUMMARY OF THE INVENTION

The present invention is directed toward increasing the efficiency and effectiveness of emergency exit signs and emergency lighting by providing very compact and slim exit signs having housings that are adapted to be easily and quickly universally mounted with either one or both sides providing an illuminated message wherein the interior lighting uses LEDs operating at approximately 1.0 watt and which are, in the preferred embodiments, powered in series using a capacitance controlled AC power source. Chargeable NiCd or similar batteries are mounted within the housing to supply a source of power in the event power to the LEDs from a building AC power source is interrupted.

In the preferred embodiments of the invention wherein emergency lighting is provided in combination with the exit signs, LED lamp assemblies are associated with the housings so that they will become operative and provide emergency lighting of a passageway in the event the AC power to a sign is interrupted. In some embodiments, the emergency lighting may be provided by either one or more high power, 0.5 to 1.0 watt, LEDs that are fixedly mounted to the sign housing or to a mounting member for the sign housing. In some embodiments, series of lower powered 20 mA LEDs may be used, alone or in combination with the higher powered LEDs, to provide emergency lighting.

In many of the preferred embodiments, the high power emergency lighting LEDs may be selectively and appropriately aimed when the signs are installed so as to direct emergency light as required for the area of installation. When the lamp assemblies are fully seated relative to the housings, light emitted therefrom is generally directed directly beneath the housings. However, the emergency lighting lamp assemblies may be deployed and thereafter pivoted and rotated so as to aim the light emitted therefrom in any desired direction.

The emergency lamp assemblies are very light in weight and compact, having diameters of approximately one half of the thickness of the sign housing. Thus the emergency lights are not only functional but they are not obtrusive nor unsightly when installed. Further, in the embodiments of the invention wherein the emergency lamps may be adjusted after installation, the lighting field for an emergency passageway may be optimized to suit the specific area of the building in which a sign is installed.

The control and charging circuitry within the housing of the signs of the present invention is also unique, resulting in the LEDs operating at less than one watt, a considerable savings in energy over prior art devices. When the LEDs to illuminate the messages of the emergency signs are being powered from a mains source of AC power, the LEDs that are powered in series with one another while the batteries are also being charged, whereas, should the AC power be interrupted or terminated, the power to the message LEDs, and the emergency LEDs if used therewith, will be supplied in series and in parallel from the batteries. The circuitry also includes a test switch that, when engaged, simulates the AC current being terminated such that the LEDs are illuminated if the batteries are properly charged.

It is an object of the invention to improve the power efficiency of emergency exit signs, and particularly combination emergency signs and emergency lights, that operate using LEDs, for both the message panels of the sign and the emergency lights, and which LEDs operate at 1 watt or less and wherein the life expectancy of the LEDs is measured in years, such that energy savings are optimized while cost for maintenance is minimized.

It is another object of some of the embodiments of the invention to provide combination emergency signs and emergency lights wherein the emergency lights include at least two high powered LED lamps that are mounted to the sign housing such that the emergency lighting is automatically activated upon a failure of AC power supply to the signs. Further, in the embodiments wherein the emergency lamps are pivotally and rotationally adjustable, the emergency lighting may be selective aimed or directed to optimize the illumination of the exit passageway. In some embodiments the LED emergency lamps are mounted to a housing or support member from which an emergency sign is suspended while, in other embodiments, the LED emergency lamps are mounted to a wall of the sign housing.

It is a further object of the invention to provide emergency exit signs and combination emergency exit signs and emergency lights wherein the message panels of the signs are illuminated by LEDs that are electrically connected in series when powered by a mains AC power source but wherein the same LEDs are connected in sets of LEDs connected in parallel and powered by batteries when power from the AC source is interrupted or terminated to thereby minimize the amount of power required to provide illumination of the LEDs. In some embodiments of the invention wherein the emergency lighting lamps include lowered powered LEDs, a series of such LEDs may be connected in series when powered by the batteries when the AC power is interrupted.

It is yet a further object of the invention to provide a combination emergency sign and emergency lights where the emergency lights include LED lamps having lenses that are smaller that prior art lenses such that the overall esthetic appearance of the sign is not adversely effected and such that the weight of the sign to which they are mounted is not significantly increased.

It is another object of the invention to provide combination emergency signs and emergency lights wherein, the emergency lights may be fixedly mounted to the signs or to mounting members for the signs and wherein combinations of high and low energy LEDs may be used to provide the emergency lighting.

It is a further object of the invention to provide emergency lighting using lamps having a plurality of low power light emitting diodes mounted relative to a single lens and wherein the low power lamps may be utilized either alone or in combination with high power light emitting diode lamps.

BRIEF DESCRIPTION OF DRAWINGS

A better understanding of the invention will be had with reference to the accompanying drawings, wherein.

DESCRIPTION OF THE PREFERRED EMBODIMENT

Figure 1:
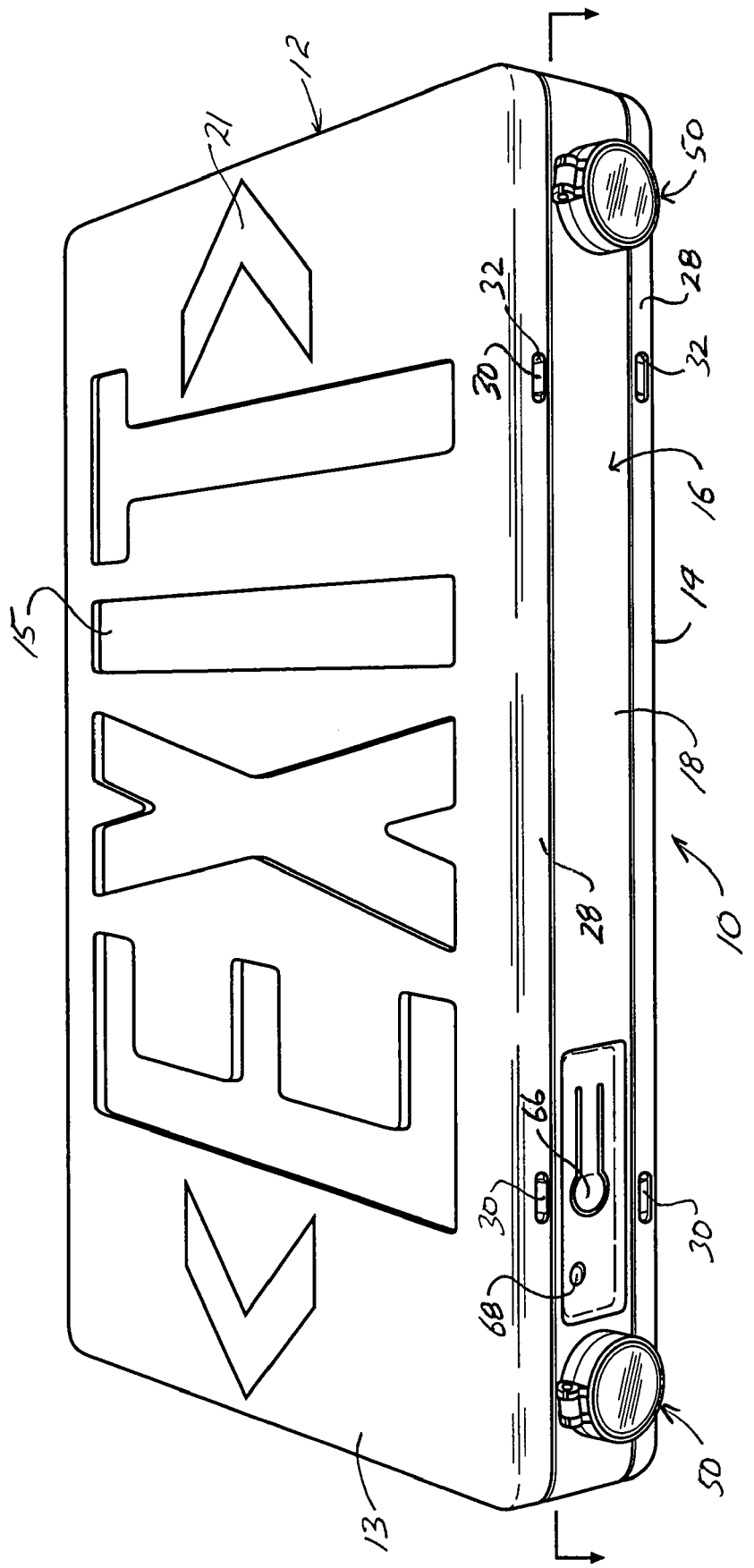
FIG. 1 is a front elevation view of a first embodiment of a combination emergency sign and emergency lights wherein the emergency lights include a pair of LED lamps that are mounted within the lower wall of the sign housing.
Figure 2:
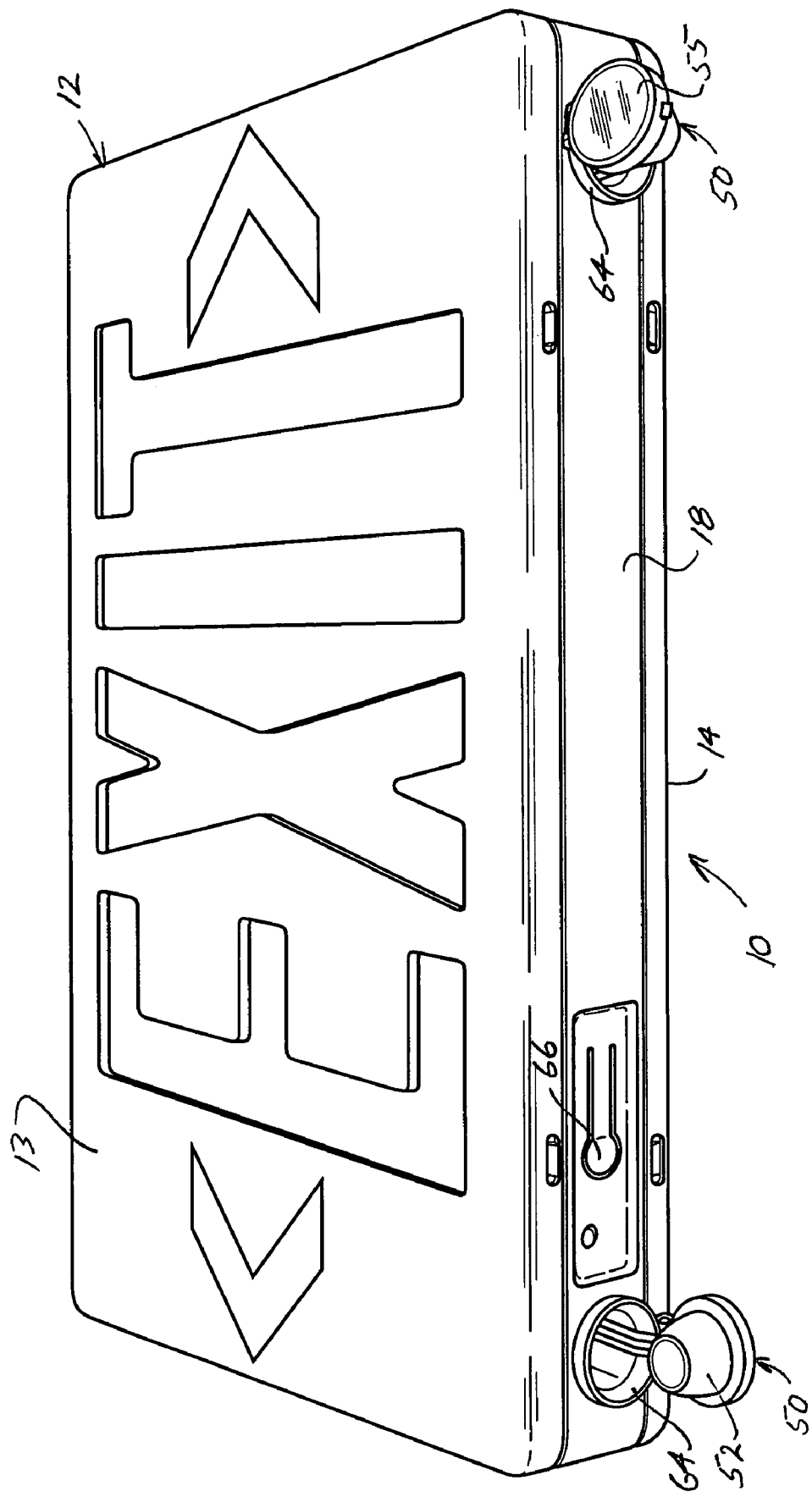
FIG. 2 is a view similar to FIG. 1 showing the pair of LED emergency lamps deployed outwardly and downwardly relative to emergency sign housing.

With continued reference to drawings, a first embodiment of a combination emergency sign and emergency light assembly 10 is shown in FIGS. 1-6 as including a housing 12 having generally flat side panels 13 and 14, at least one of which has cut outs 15 formed therein that define an emergency message, such as "EXIT". The side panels are preferably removably mounted, such as by being snap fitted, to a primary frame 16 of the housing. The frame 16 includes portions that define top and bottom walls 17 and 18 and opposite ends 19 and 20 of the housing and that are preferably molded together as a single or integral unit.

Figure 3:
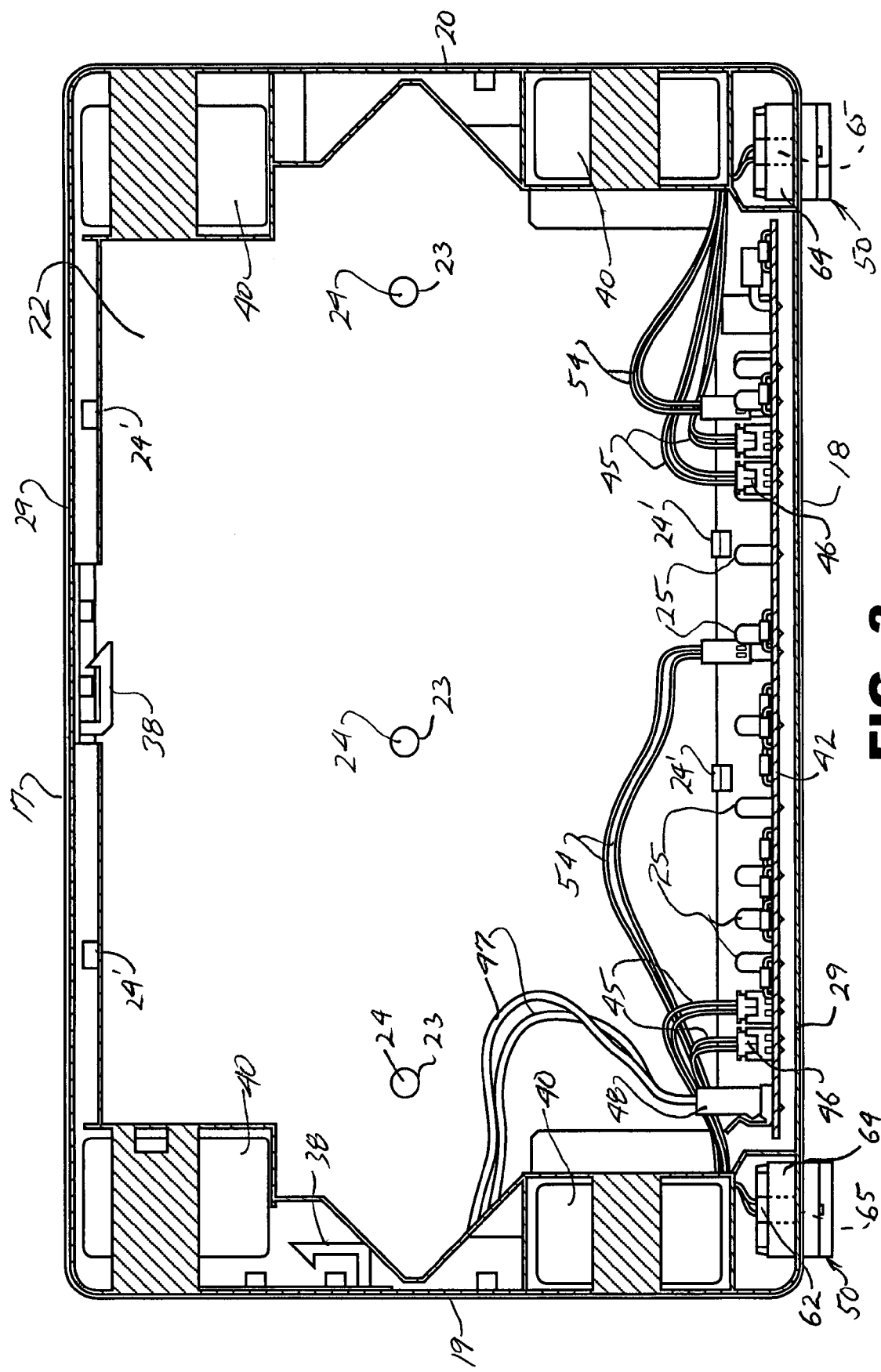
FIG. 3 is a cross sectional view taken along line 3-3 of FIG. 1 showing the interior of the sign housing including the interior LEDs and batteries.

In some embodiments of the invention both of the side panels may include cut outs defining the emergency message and may also include punch out directional indicators 21 that may be in the form of an arrow and which are removed during installation of the assembly depending upon whether or not the arrow is necessary to indicate an emergency egress direction. Mounted within the housing in overlaying relationship to the cut outs and the punch out directional indicators is one or more sheets of translucent plastic material 22 that are preferably of a color that will stand out and be easily viewable to clearly mark an exit or the direction of an egress passageway toward an exit. In most circumstances, the material will be red, such that the red color will glow by being back lighted by a first plurality of high powered message illuminating light emitting diodes (LEDs) 25 mounted within the housing, as will be described in greater detail hereinafter. As shown in FIG. 3, a single sheet of material 22 is frictional mounted in overlaying relationship to the cut outs 15 defining the word "EXIT" by having openings 23 therein that cooperate with three central studs 24 and edge engaging locking tabs 24' formed on the inner surface of the side message panel 13 and/or 14.

As previously noted, both of the side message panels 13 and 14 may be removable mounted to the frame 16. In the embodiment shown, each of the side panels includes continuous rims 28 that cooperatively seat on a continuous flange 29 formed along the top, bottom, front and rear walls of the frame. The side panels are locked in place by pairs of locking tabs 30 that are integrally molded along the continuous flange 29 of the frame and that snap fit into spaced openings 32 formed in the continuous rims of the side panels.

The assembly 10 of the first embodiment is specifically constructed to permit mounting either with one of the side panels against a wall, with the top wall 17 mounted against a ceiling fixture or with one of the end walls 18 and 19 mounted to a wall fixture or bracket. In this respect, removable inserts, not shown, are mounted to the top and end walls of the frame 16. Molded within the interior of the frame are mounting clasps 38 that are positioned adjacent openings that would be defined in the top or end walls of the frame when one of the inserts is removed. When one of the inserts is removed, a ceiling or wall mounting fixture is received through one of the openings and thereafter engaged by one of the sets of mounting clasps 38.

With reference to FIG. 3, mounted within the housing are four battery packs 40 each having four rechargeable Nickel Cadmium (NiCd), or equivalent, batteries. The battery packs are wired to a control circuit board 42 that is removably mounted to an inner surface of the bottom wall 18 of the frame 16. The circuit board is normally retained in place by a plurality of locking tabs that are integrally molded with the bottom wall and which pass through aligned openings, not shown, in the circuit board. The battery packs are connected to electrical connectors 45 that are cooperatively mounted to electrical connectors 46 mounted to the circuit board. In this manner, backup or emergency DC power is provided to power the LEDs in the event AC power is terminated to the circuit board 42.

Although not shown in FIG. 3, the circuit board will be enclosed within a protective enclosure, as required by government regulations, to prevent direct access to the components mounted to the circuit board, including the AC power input connector. Also, in order to further reduce manufacturing costs, in some embodiments, the battery packs may be electrically connected to a common output connector by way of which the batteries would be connected to the circuit board as opposed to the four connectors shown in the drawings.

Power to the circuit board for the LEDs and for charging the battery packs is normally provided from a buildings AC power source. AC power conductors 47 are provided that are appropriately connected to the AC power lines during installation. The conductors 47 are connected to a female electrical connector 48 that is removably mounted on a male electrical connector, not shown, of the circuit board. As shown in the drawings, the message illuminating LEDs 25 are directly mounted to the circuit board and the manner in which they are powered will be described with respect to a control circuit diagram as described hereinafter.

Figure 4:
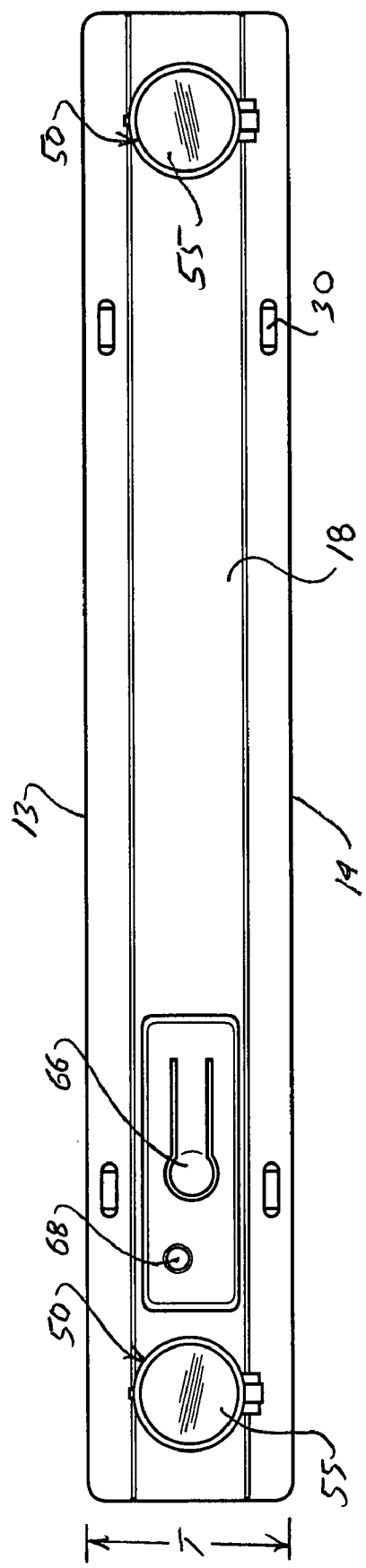
FIG. 4 is a bottom view of the embodiment of the invention shown in FIG. 1.
Figure 5:
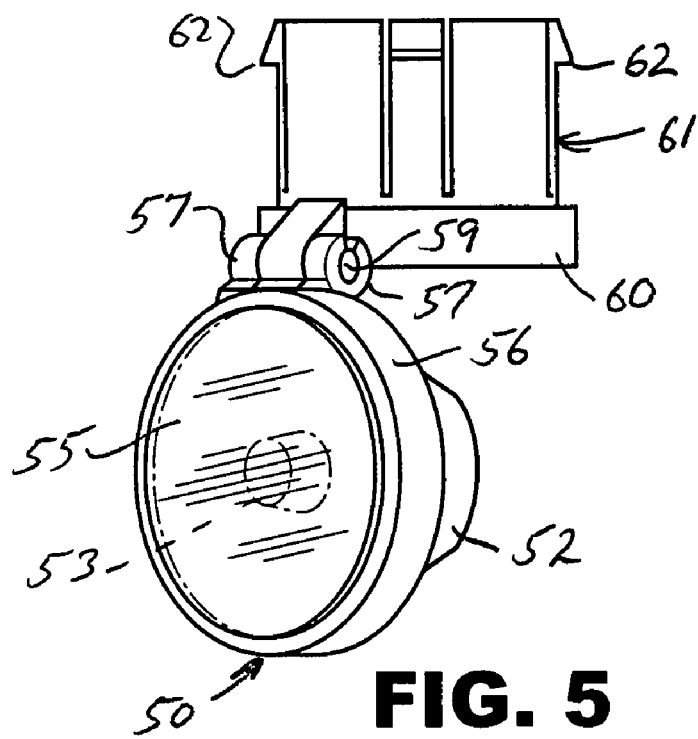
FIG. 5 is a perspective view of one of the high powered LED emergency lamps of the embodiment of FIG. 1 with the lamp in a deployed position pivoted outwardly from the bottom of the sign housing.
Figure 6:
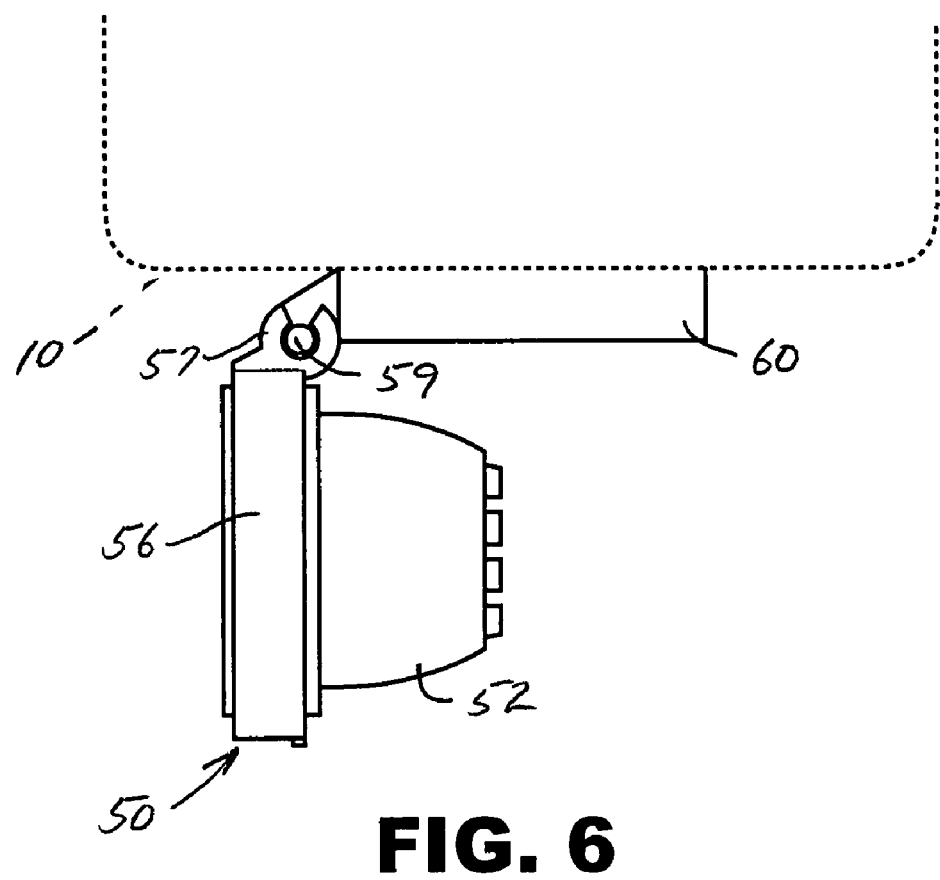
FIG. 6 is a right side view of the lamp of FIG. 5.

The assembly 10 also includes emergency lighting and, in this respect, includes at least two LED emergency lamps 50 which, in the preferred embodiment shown in FIGS. 1-6, are mounted in the bottom wall 18 of the frame 16. In some embodiments, the lamps 50 may be fixedly mounted to the housing, however, in the preferred embodiments, the emergency lamps are adjustable mounted to the housing. Each lamp includes a somewhat conical housing 52 in which a single high powered LED 53, see FIG. 5, is mounted. Electrical wires 54 extend from the LED to the circuit board 42. Each lamp 50 further includes an outer lens 55 mounted to the conical housing 52 by way of an annular flange 56. The annular flange includes a pair of snap members 57 that frictionally engage a pair of pivot arms 59 that extend from an outer annular flange 60 of a hollow swivel 61 that is mounted through an opening in the bottom wall 18 of the frame 16.

As shown with respect to FIGS. 1 and 4, the diameter of the lens of the lamps 50 are substantially less in dimension than a thickness dimension "T" of the housing between the side panels 13 and 14. In this manner, the lamps do not extend or protrude outwardly relative to the side panels and thus the overall sign structure is very neat and compact which not only facilitates handling and shipping costs, but also makes the overall appearance very sleek as compared to prior art structures.

The inner end of the swivel includes locking tabs 62 that engage a locking ring 64 molded to the bottom wall of the frame when the hollow swivel is fully seated within the frame. When the swivel is being inserted within the locking ring 64, the tabs 62 are aligned to slide along opposing slots 65 in the ring. Once the swivel is completely inserted, the ring is rotated to move the tabs out of alignment with the recesses such that the tabs engage the inner rim of the locking ring to thereby prevent withdrawal of the swivel. In some embodiments, the tabs 62 may be connected to prevent flexing motion relative to one another. By appropriate realignment of the tabs 62, the swivel and the attached lamp 50 may be removed from the frame.

As described, the swivel is generally tubular such that it is rotatable within the opening in the bottom wall of the frame. Because of the pivotable mounting of the lamp to the swivel and the rotational movement of the swivel to the housing, the lamps 50 may be deployed by being pivoted outwardly from seated engagements with the swivels and, thereafter, the lamps adjusted to direct light from the LEDs in any desired direction. In this manner the emergency lighting may be directed or aimed as is necessary to maximize the illumination efficiency of the emergency LEDs.

With reference to the bottom view of FIG. 4, the assembly 10 also includes a test switch 66, that when pushed, will open the power circuit from the AC source and illuminate the message and emergency LEDs by the batteries and thereby provide an indication that the batteries within the assembly are charged and functioning properly. Also provided is a visual indicator 68 that glows to provide an indication that the AC power is "ON".

Figure 7A:
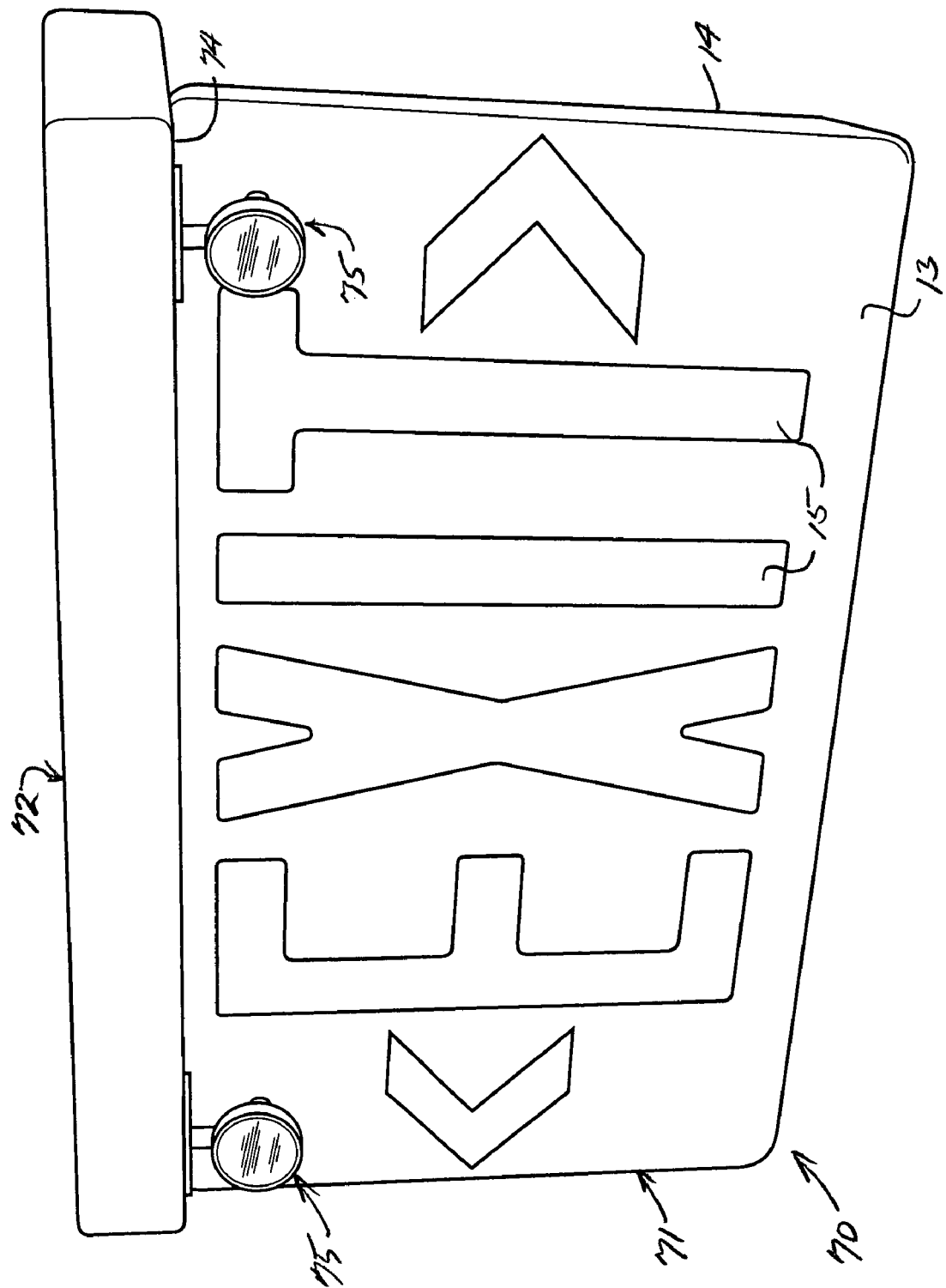
FIG. 7A is a front perspective view of a first alternate embodiment of combination emergency sign and emergency lights of the invention and showing an alternate structure of LED emergency lamp mounted to a mounting member for the sign.
Figure 9:
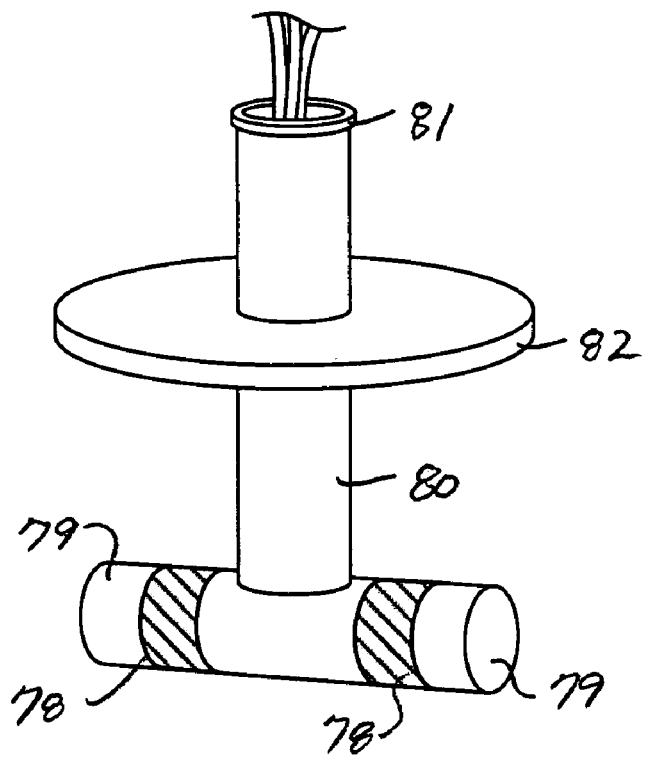
FIG. 9 is an enlarged perspective view of the slide mount for the LED emergency lamps of FIGS. 7B and 7C.
Figure 10:
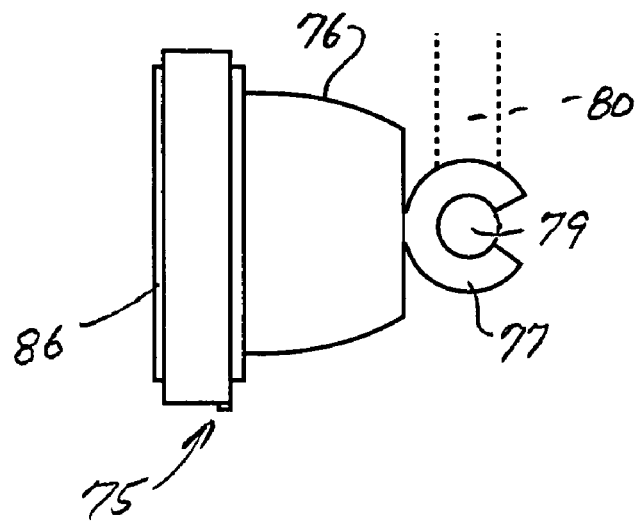
FIG. 10 is a right side view of one of the emergency lamps of FIG. 7A-7C.

With reference to FIGS. 7A, 9 and 10, another embodiment of the invention is shown that includes the same LEDs for emergency sign illumination and emergency lighting when the AC power is interrupted. In this embodiment, the combination assembly 70 includes the same control circuitry that is used in the first assembly and which will be described in greater detail hereinafter. The assembly 70 includes a housing 71 that may include most of the features of the housing 12 of the previous embodiment. The housing 71, however, is suspended from a ceiling mount 72 that is designed to be secured directly to a ceiling using suitable fasteners, not shown. The same circuit board 42, as described in the first embodiment, may be mounted within the housing 71 and the same interior LEDs 25 are provided to illuminate the message cut outs 15 in one or more side panels 13 and 14 of the housing. In the present embodiment, the emergency lamps and their mounted swivels may be the same as described with respect to the previous embodiment and mounted to the bottom wall of the housing 71 or be the same and mounted to a bottom wall 74 of the ceiling mount 72. The bottom wall may be convex as opposed to the rectilinear configuration shown in FIG. 7A.

However, in the drawing figures, a modified LED emergency lighting lamp 75 is shown which includes a conical lamp housing 76 having two pair of arcuate contact arms 77 extending there from which are pivotally mounted to a pair of electrical contacts 78 provided on support pins 79 supported on a hollow swivel member 80. The swivel member 80 extends upwardly through the wall of the ceiling mount and is locked in place so as to be rotatable within an opening in the ceiling mount by locking tabs, not shown, that engage a locking ring 81 integrally formed with the swivel member 80. An annular flange 82 seals the opening in the ceiling mount 72.

Each LED lamp 75 also includes a single high powered LED which is connected to the circuit board by way of wires 84 that extend through the swivel and which are connected to the annular electrical contacts 78 formed on the pins 79 and which annular contacts engage with semi-annular electrical contacts provided on the inner surfaces of the arms 77 of the lamp housing. The lamp 75 further includes an outer lens member 86. As with the previous embodiment, the lamps 75 are universally adjustable so that they may be selectively aimed or adjusted to direct light as required at the point of installation. The lamps 75 may also be used in the originally described first embodiment and be within the teachings of the present invention.

Figure 7B:
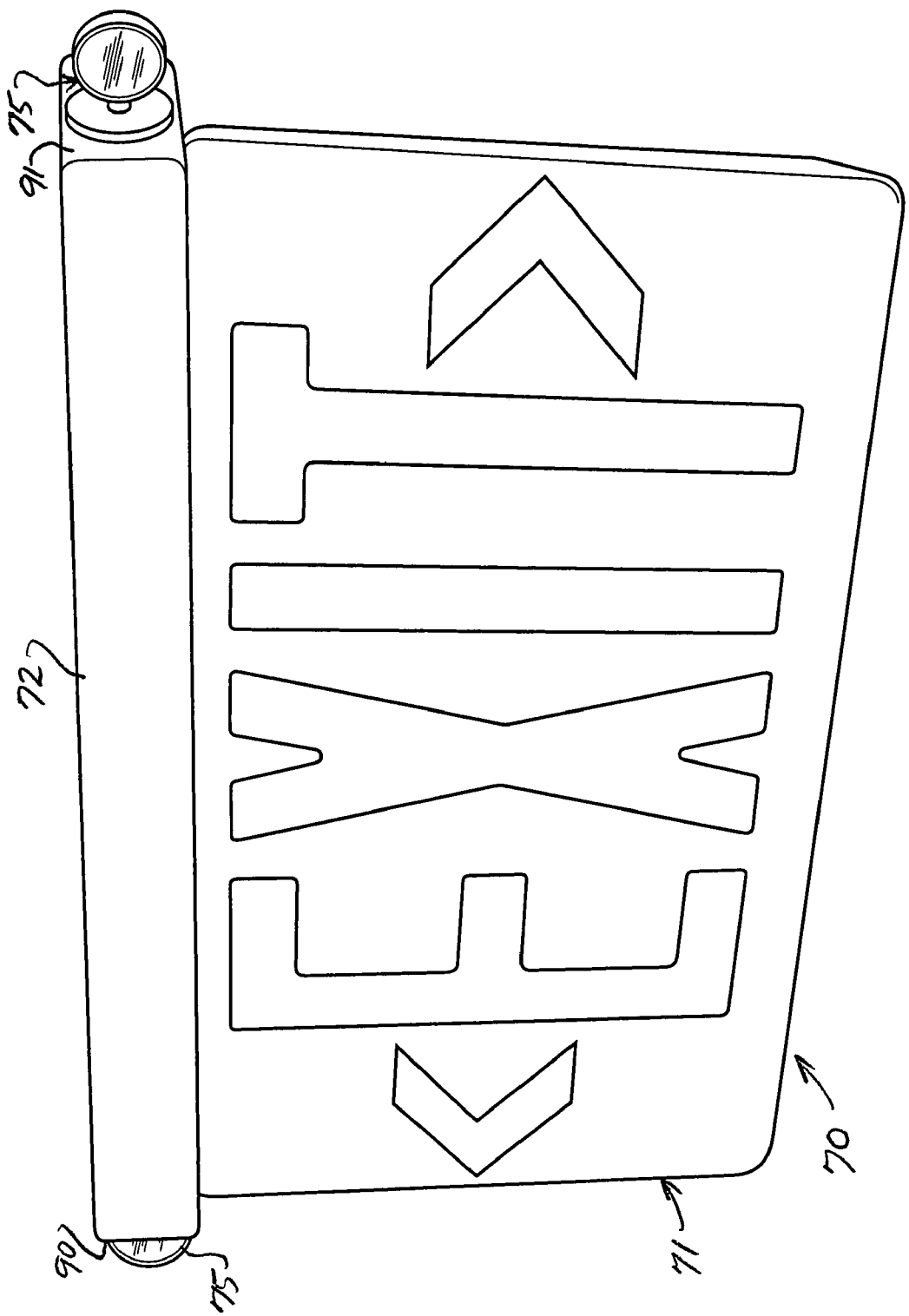
FIG. 7B is a modification of the embodiment of invention shown in FIG. 7A wherein the emergency lamps are mounted to the ends of the mounting member.
Figure 7C:
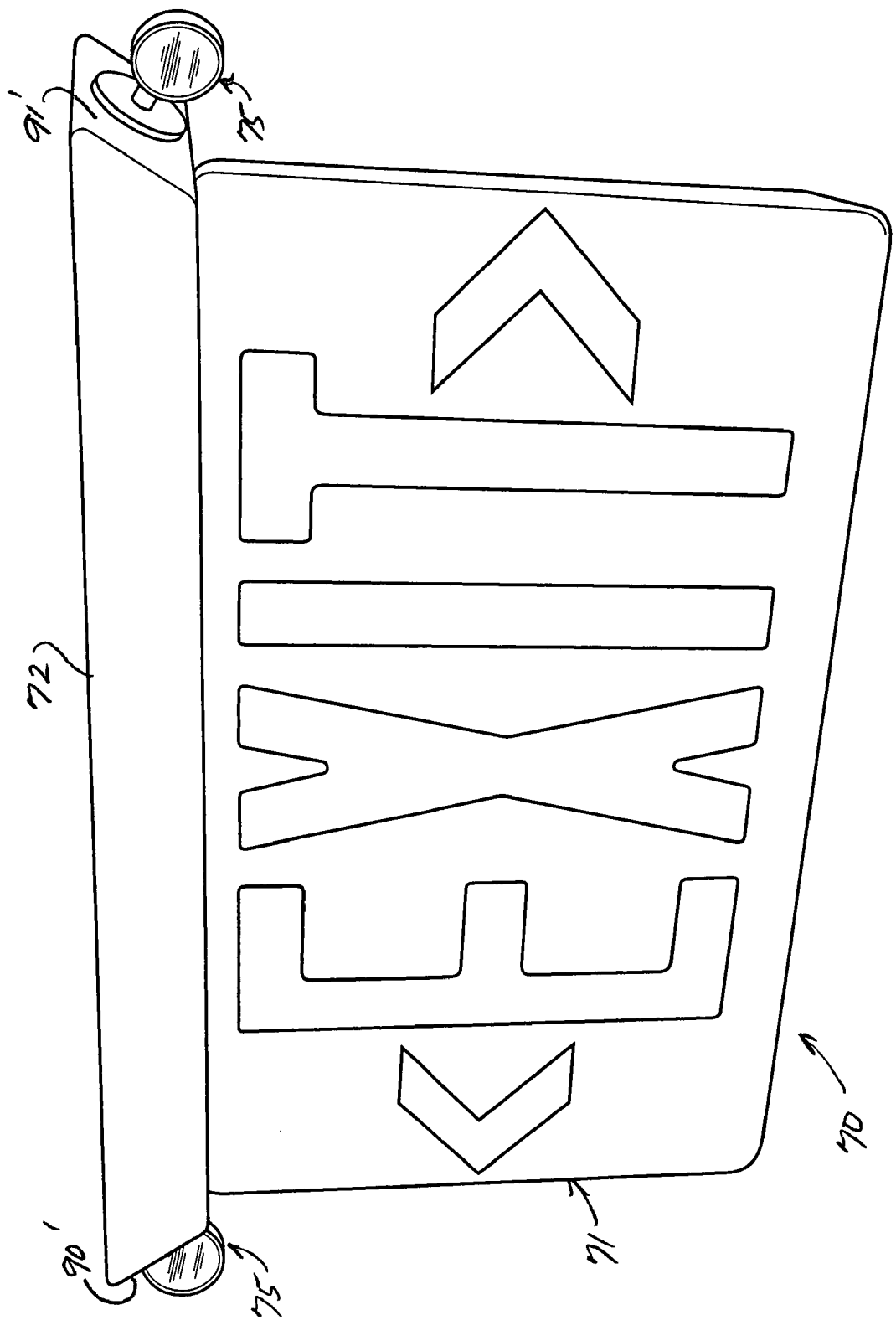
FIG. 7C is another modification of the embodiment of invention shown in FIG. 7A.
Figure 7D:
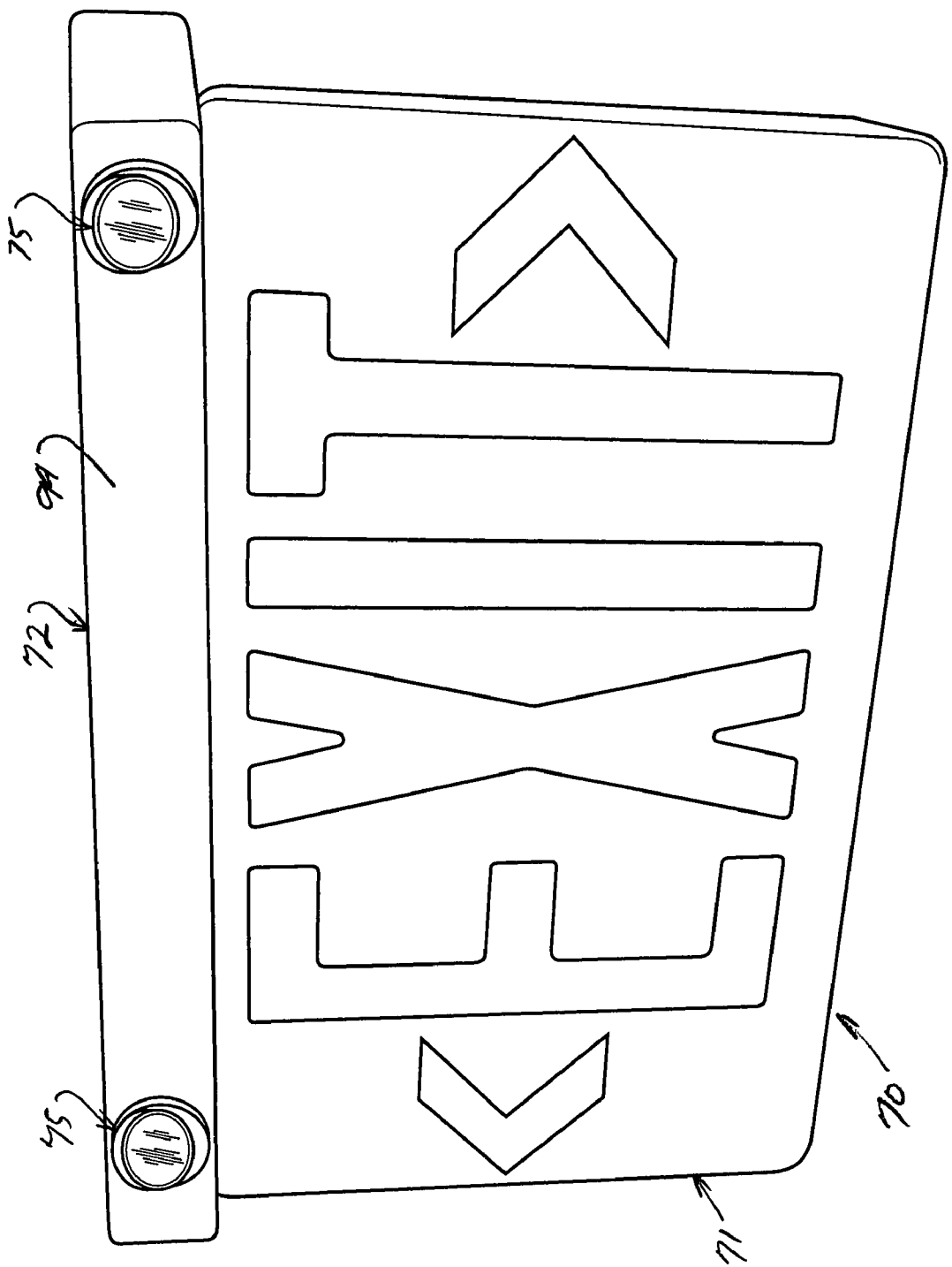
FIG. 7D is another modification of the embodiment of FIG. 7A of the invention.

With reference to FIGS. 7B, 7C, 7D, 8, 9 and 10, other variations or embodiments of the invention are disclosed which are essentially similar to the embodiment of FIG. 7A except that the emergency lamps 75 are mounted to the opposite end walls 90 and 91 of the ceiling mount 72 of the embodiment of FIG. 7B and opposite tapered end walls 90' and 91' of the ceiling mount 72 of the embodiment of FIG. 7C. In the embodiment of FIG. 7D, the lamps 75 are pivotally mounted relative to at least a front wall 94 of the ceiling mount. In some embodiments, additional lamps 75 may be provided on the opposite or rear wall of the ceiling mount.

Figure 8:
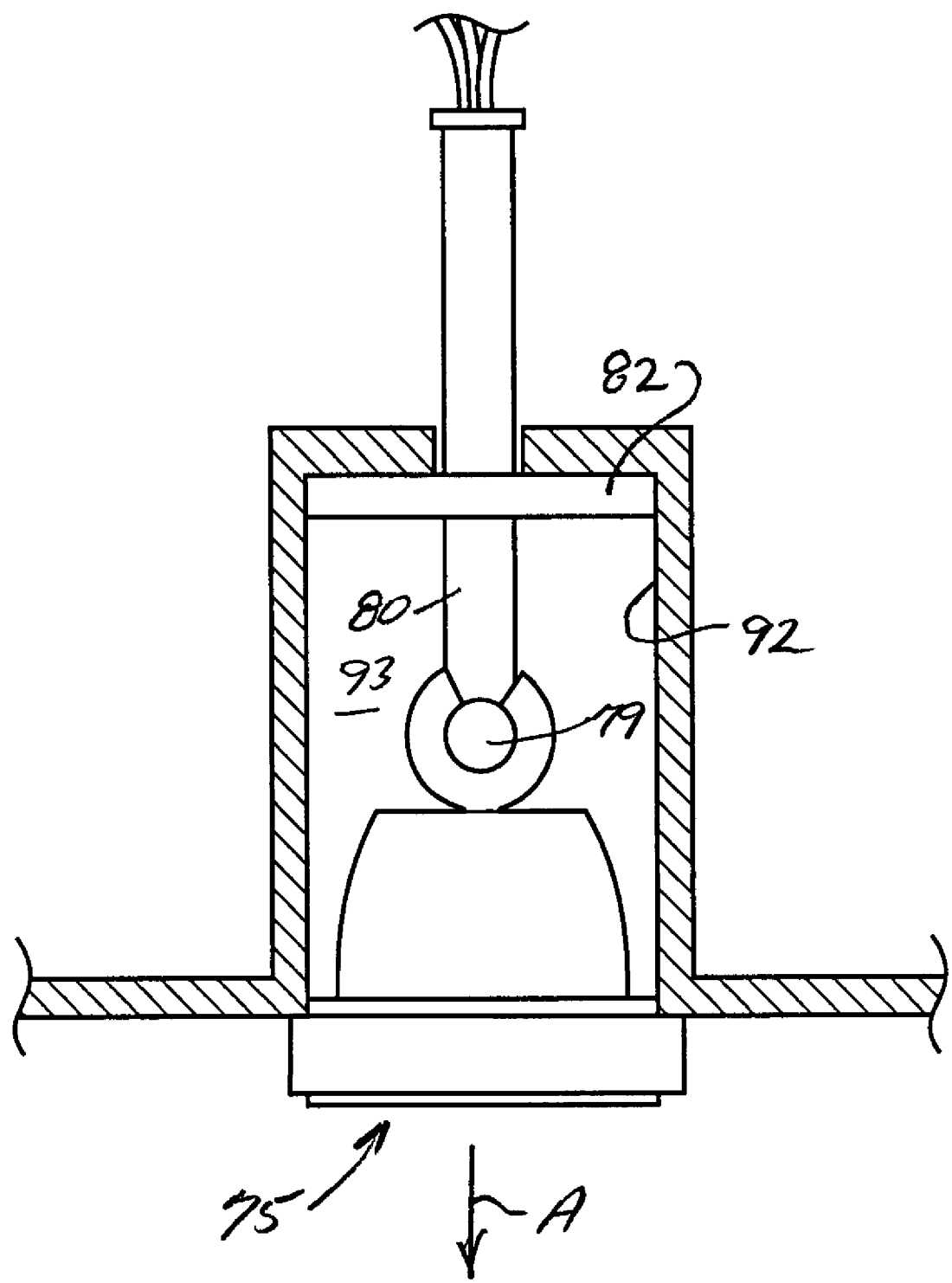
FIG. 8 is an enlarged cross section of one of the LED emergency lamps shown in FIG. 7B or 7C in a retracted or non-deployed position with respect to the sign housing or sign mounting member.

As shown in FIG. 8, in the embodiments of FIG. 7A-7D, the emergency lamps 75 may be outwardly deployed from the ceiling mounts 72 or seated within recessed housings 92 formed within the ceiling mounts. In FIG. 8, the annular flange 82 associated with the emergency lighting lamp 75 is slidably guided within a chamber 93 defined within the housing 92 such that the outer annular rim of the lamp is engaged with the surface of the end wall of the ceiling mount. By pulling outwardly on the lamp 75, the lamp may be deployed outwardly in the direction shown be arrow "A". Thereafter, the lamp may be rotated and/swivelled to aim light there from in a desired direction.

Although only two LED lamps are shown in the embodiments described herein for emergency lighting, additional lamps may be provided to increase the amount of illumination, however, the two high powered LED lamps described provide sufficient illumination to meet US Federal standards for emergency lighting fixtures, and do so with a large savings in energy consumption. The high power LEDs utilized with the present invention operate at one (1) watt or less and at approximately 0.8 volt for the total LEDs using the electrical circuit shown in FIG. 11. Operating at one watt or less, the LEDs of the invention can provide between 50 and 200 lumens of light energy. This means that the signs of the present invention may operate at significantly lower power levels than conventional signs with emergency lights and thus reduce operating costs while providing a considerable savings in energy consumption. Further, the life expectancy of the LEDs is easily twenty times, or more, greater than conventional incandescent bulbs used in conventional emergency exit signs.

Figure 11:
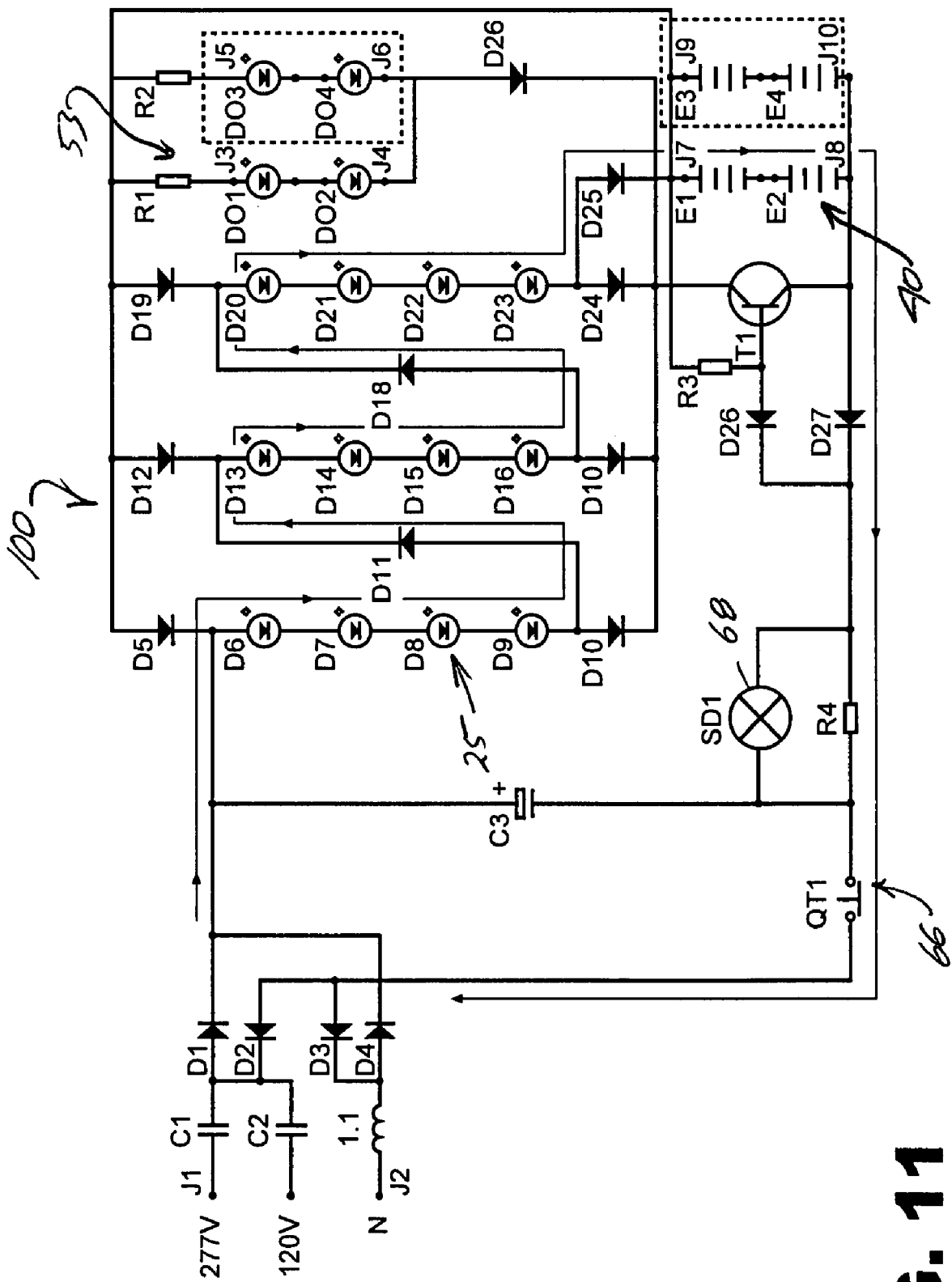
FIG. 11 is a diagram of the control circuitry of one of the combination emergency sign and emergency lights and illustrating the current flow from an AC source to power the sign illuminating LEDs and for charging internal batteries.

With particular reference to FIG. 11, a diagram of a control circuit 100 of one of the combination exit and emergency lighting signs of the invention is shown. Under normal operating conditions, the message illuminating LEDs 25, shown at D6-D23, for illuminating the message cut outs, are powered in series from either a 120 Volt or 277 Volt AC mains power source. The current is regulated through either the capacitors C1 or C2 through the diode D1 to the LEDs D6-D23 with the diodes D5, D12 and D19 directing the current flow in series through the LEDs and through diode D25 to charge the emergency backup batteries 40, shown at E1 and E2. The power to the circuit does not require transformers associated with prior art circuits and thus significantly improves on power efficiency. In some embodiments, additional backup battery packs E3 and E4 may be continuously charged when the sign is being power by an AC source. When the AC power is "ON", the emergency lighting LEDs 53, shown at D01 and D02 are not powered as power is blocked by the diode D26. In some embodiments, more than two emergency LEDs may be used in the signs of the invention with two additional emergency LEDs D03 and D04 being shown in the circuit diagram. These additional emergency LEDs may be mounted to the same sign housing or they may be remotely spaced from the sign housing in separate housings mounted in spaced relationship to the exit sign housing so as to provide an increased area of coverage from the emergency lights of the invention.

Figure 12:
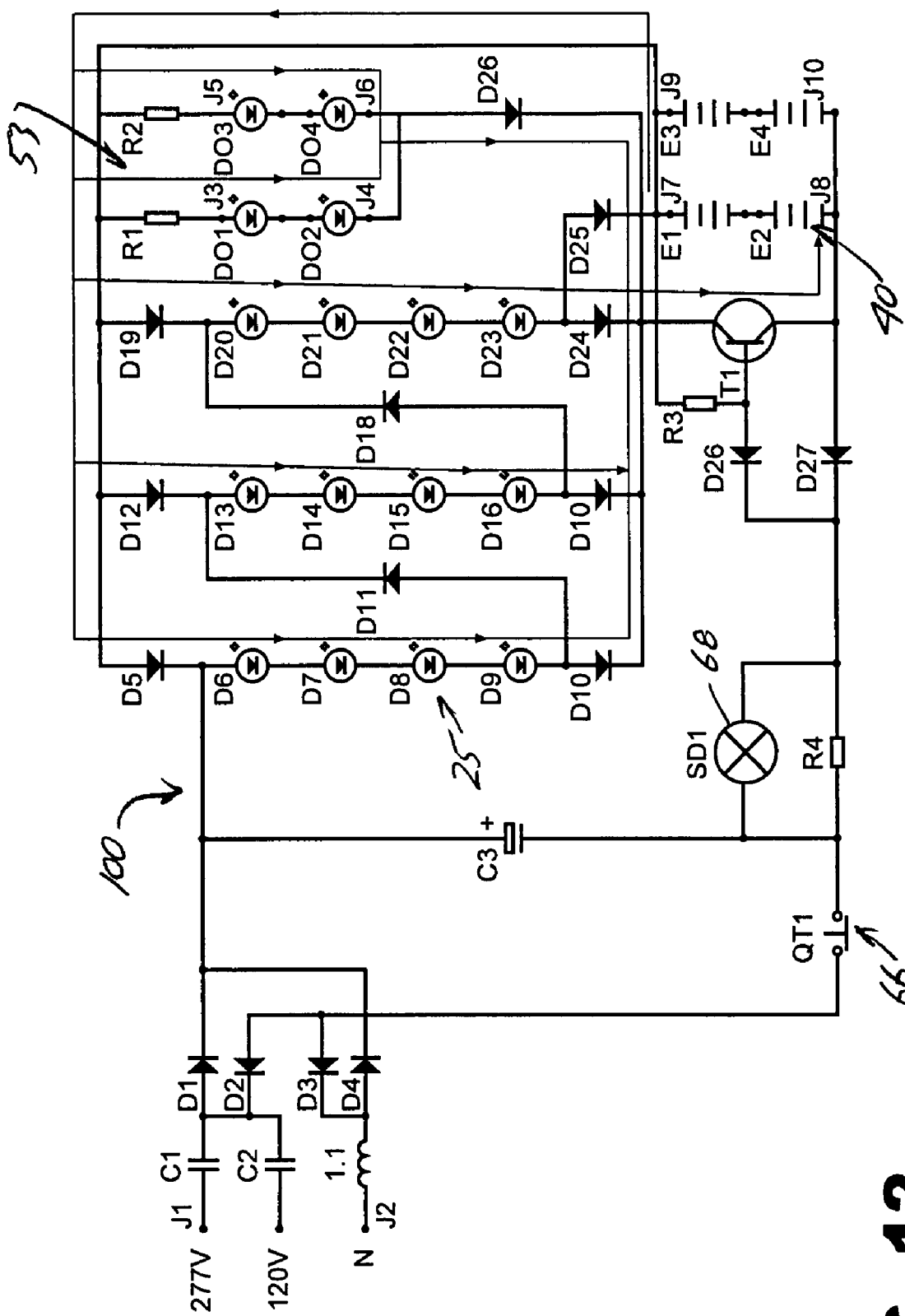
FIG. 12 is a diagram of the control circuitry shown in FIG. 11 illustrating the current flow when the AC power source has been interrupted and power to both the sign illuminating LEDs and the LED emergency lamps is supplied from the internal batteries.

In the event of a loss of AC power, and as shown by the flow diagram of FIG. 12, power to all of the LEDs is supplied by the backup batteries 40. In such event, the sets of LEDs 25 and 53 are connected in parallel as the current flows through to the emergency LEDs D01-D04 and the diodes D5, D12 and D19 to the three series of message illuminating LEDs D6-D9, D13-D16 and D20-D24.

As described, the signs of the present invention include a test circuit to simulate the loss of electrical power to ensure the backup batteries are properly charged. Under normal AC operating conditions. The AC indicator light 68, LED SD1, will be illuminated indicating that AC power is flowing through the control circuit to charge the batteries. To test the batteries, the test switch 66 is depressed thereby opening AC power to the message LEDs and causing power to both the message and the emergency LEDs to be provided by the backup batteries 40. Upon release of the test switch, the power to the message LEDs will again be supplied by the AC power source.

Figure 13:
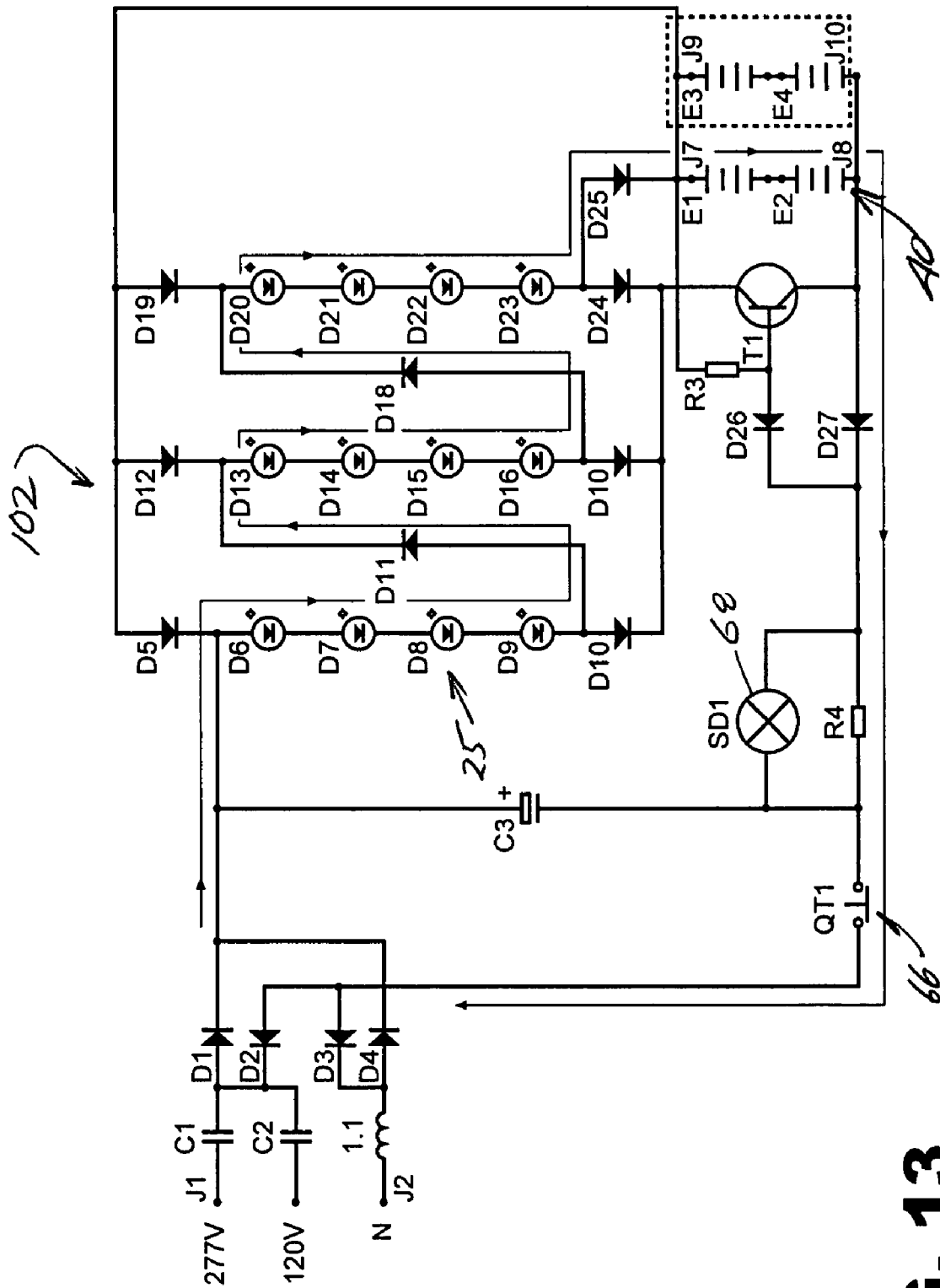
FIG. 13 is a diagram of a control circuit for an emergency sign without the emergency LED lamps and illustrating current flow from the AC power source.

With particular reference to FIG. 13, a control circuit 102 which is similar to that of the circuit 100 as previously described is shown. This circuit, however does not include the emergency light emitting diodes D01-D04 as the circuit 102 is only for use in an emergency sign without emergency lights. The circuit, however, provides the same reduction in operating power and thus the same energy savings previously described. When AC power is provided, the message LEDs are connected in series with the batteries being charged. Upon interruption of AC power, the batteries 40 will supply power to the three sets of LEDs in parallel. Also, as previously described, the AC power is provided through the capacitors C1 or C2 and no transformer is necessary.

Figure 14:
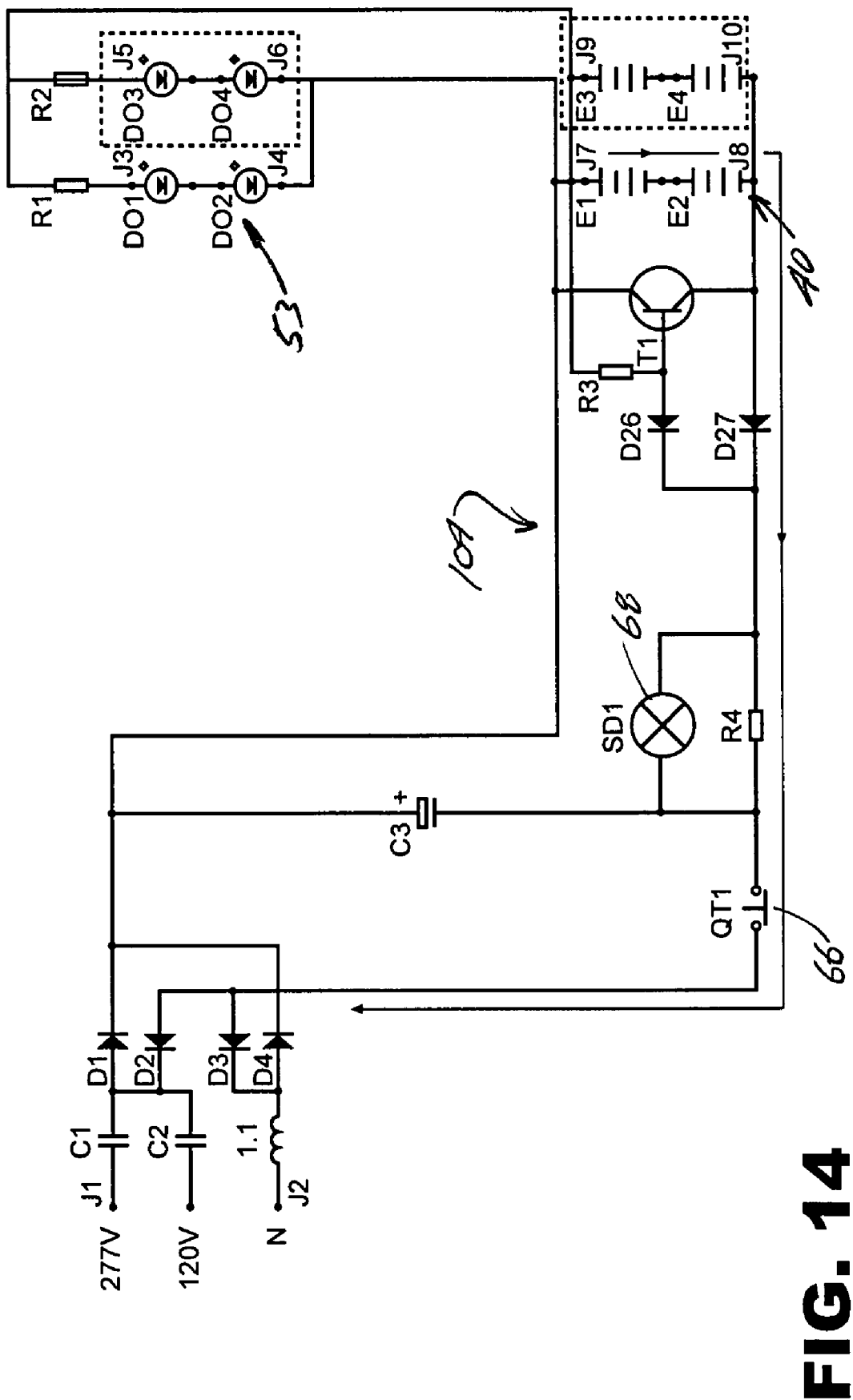
FIG. 14 is diagram of a control circuit for an emergency LED light source without an illuminated message sign and illustrating current flow from the AC power source to charge internal batteries.

With reference to FIG. 14, an electrical circuit 104 for use with an emergency LED light source 53 including LEDs D01-D04 is shown. The emergency light source is not in combination with an emergency exit sign. The LEDs may be mounted in the same type of lamps as previously described that are either fixedly or adjustably mounted to a housing by way of which the lamps may be affixed to a wall or ceiling surface. The supply of AC current is through either the capacitors C1 or C2 to charge the emergency batteries 40. Upon interruption of the AC power, the backup batteries will supply power to the emergency lighting LEDs. Once AC power is restored, power to the LEDs is terminated and the batteries are recharged.

Figure 15:
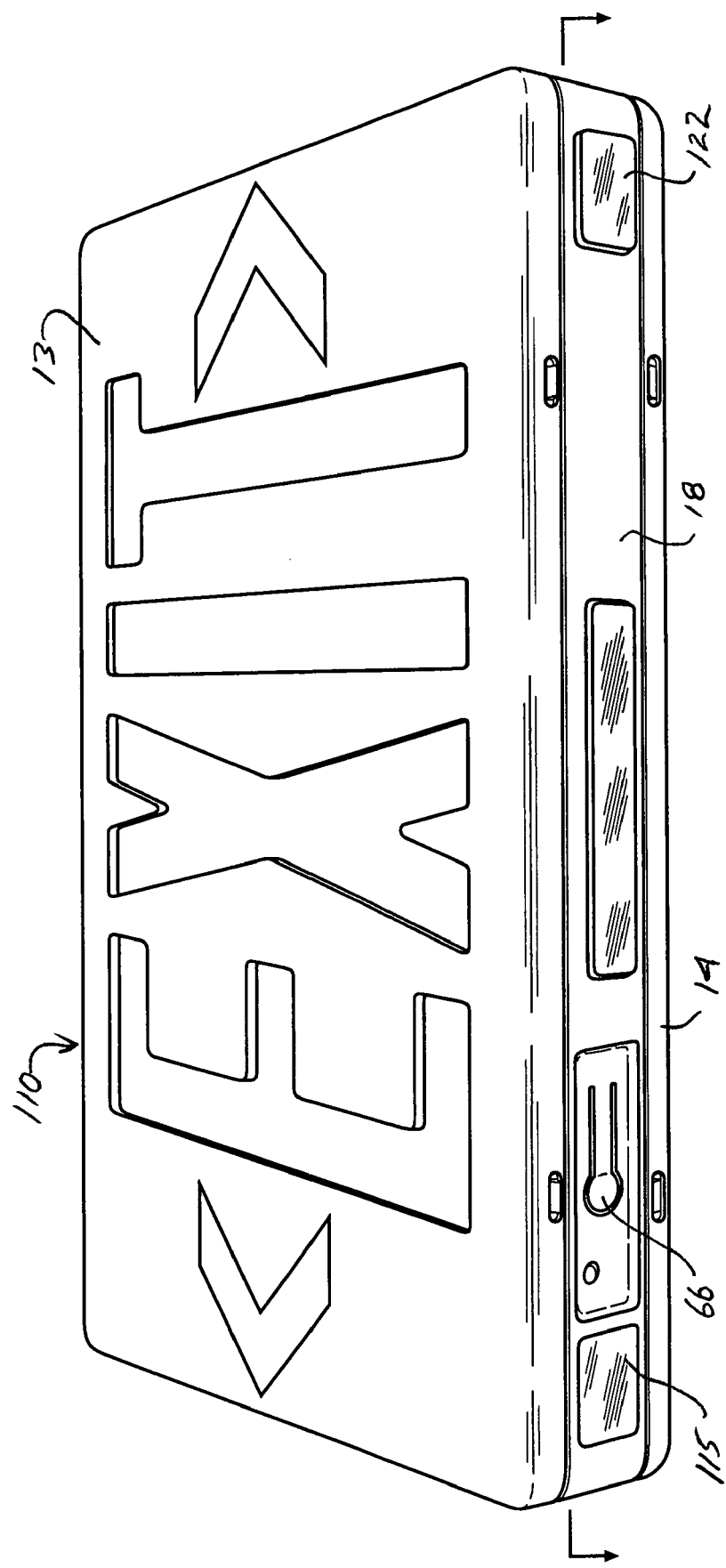
FIG. 15 is a bottom perspective view of a further embodiment of the invention showing the emergency lights fixedly mounted to the housing of the emergency sign.
Figure 17:
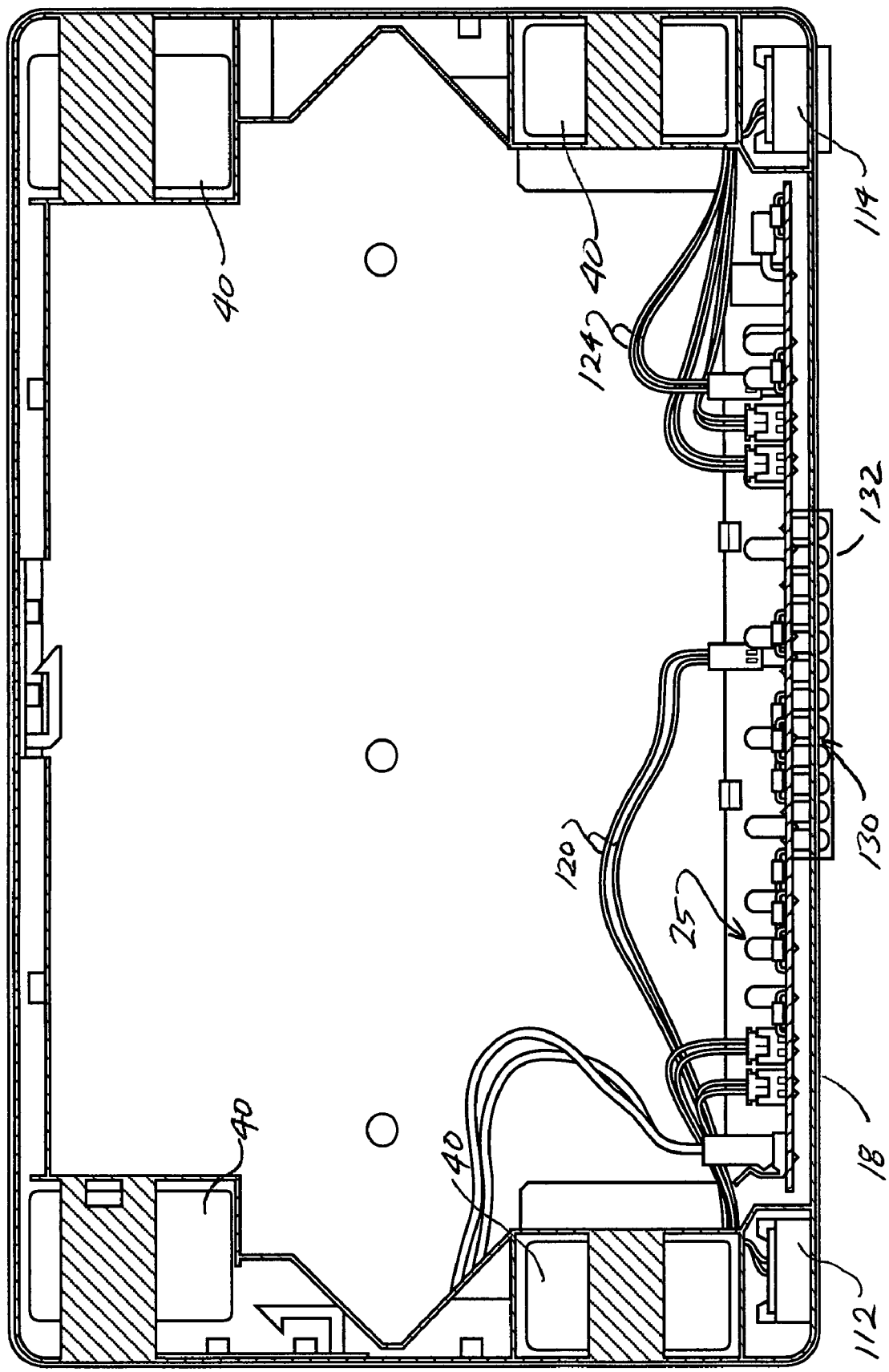
FIG. 17 is a cross section throught the sign of FIG. 15 showing the fixed emergency LEDs wherein a combination of high and low powered LEDs are shown in use.

Another embodiment of the invention is shown in FIGS. 15 and 17 wherein the emergency LEDs are fixedly mounted within the housing of the sign 110. As the structure of the sign is essentially the same as the sign of FIG. 1, the same reference numbers are used to identify components of the sign. As opposed to the deployable and adjustable LED emergency lamps 50 of the embodiment of FIG. 1, two fixed LED lamps 112 and 114 are shown mounted to the lower wall of the housing. Each lamp includes a single high power LED as previously described relative to the embodiment of FIG. 1. A lens 115 of the LED 112 is shown being generally flush with the lower wall of the housing such that the LED of the lamp 112 is recessed within the housing. The LED of the lamp 112 is connected to the circuit board by electrical wires 120. Generally, if the flush type mounting is to be used, at least two lamps 112 would be provided in the housing as opposed to the two different lamps 112 and 114 that are shown.

The LED Lamp 114 includes a lens portion 122 that is extruded with the lower wall of the housing and extends outwardly by about 6 mm. The LED lamp 114 is connected to the circuit board by wires 124. Generally, if the extruded type mounting is to be used, at least two lamps 114 would be provided in the housing as opposed to the two different lamps 112 and 114 that are shown.

Although the lenses 115 and 122 are shown as being somewhat rectangular in FIG. 15, the lenses may be round or of some other configuration.

Figure 18:
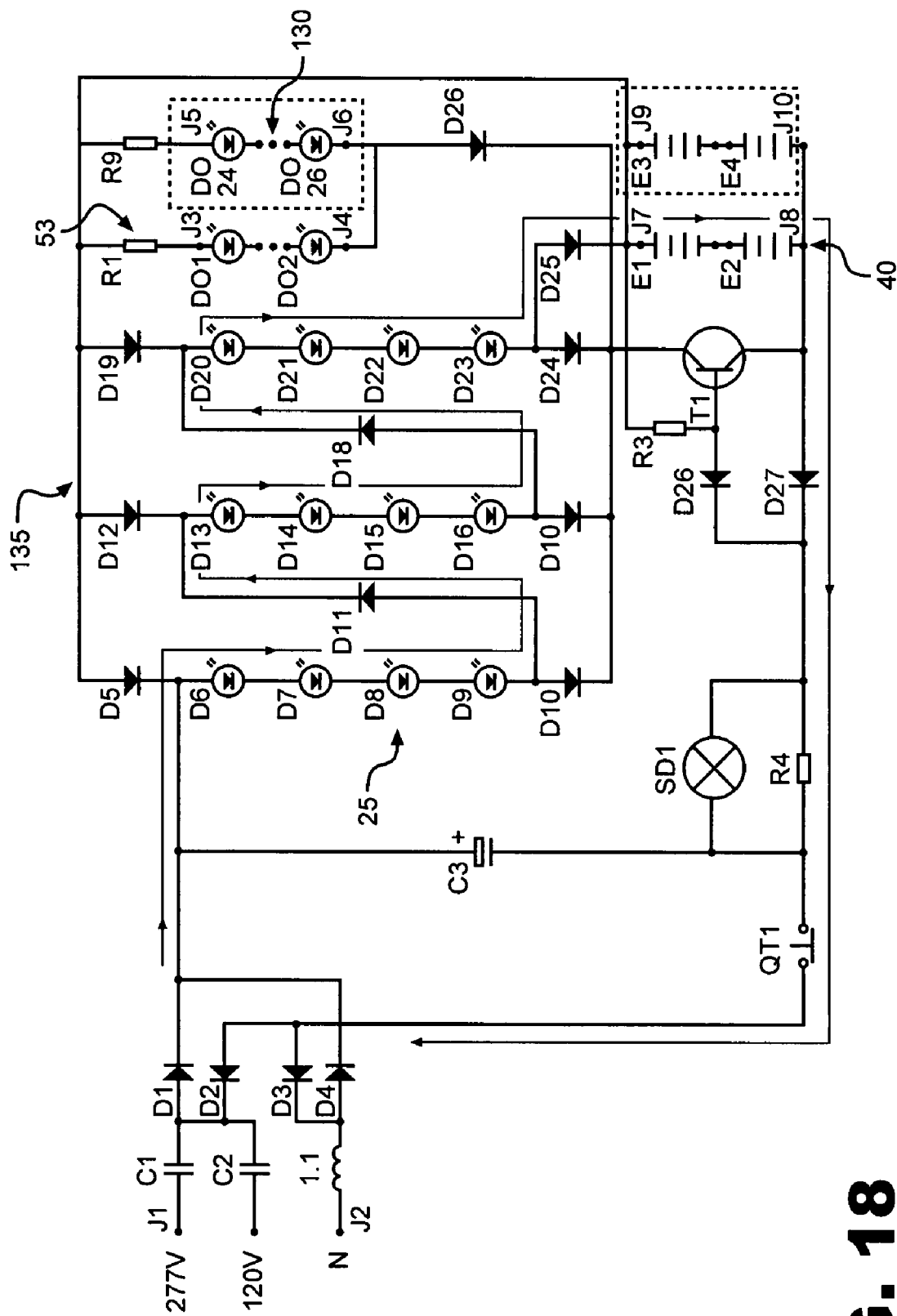
FIG. 18 is a control circuit diagram for the embodiments of FIGS. 15-17 and which is similar to that of FIG. 11 with the exception that a series of low powered emergency LEDs are powered in parallel with higher powered LEDs by the backup batteries.

The sign 100 also is shown incorporating a plurality or array of low powered LEDs 130 that may be used alone or in combination with the high powered lamps 112 or 114. As shown, a generally central elongated lens 132 is provided in the lower wall of the housing with the lens extending slightly outwardly of the lower wall. The plurality of low powered LEDs 130 are mounted within the projecting portion of the lens 132 or generally flush with the lower wall of the housing. The LEDs are preferably 20 mA which are approximately 5 mm in diameter. In the embodiment shown, three sets of eight such LEDs, in each set, are connected to be powered by the backup batteries 40 should AC power to the sign be interrupted. The modified circuit diagram 135 of FIG. 18 reflects the three sets of eight LEDs 130 (D024-D026) connected in series and parallel to the LEDs D01 and D02 of the higher powered lamps 112/114. The lens 132 may also be mounted generally flush with the lower wall of the housing.

Figure 16:
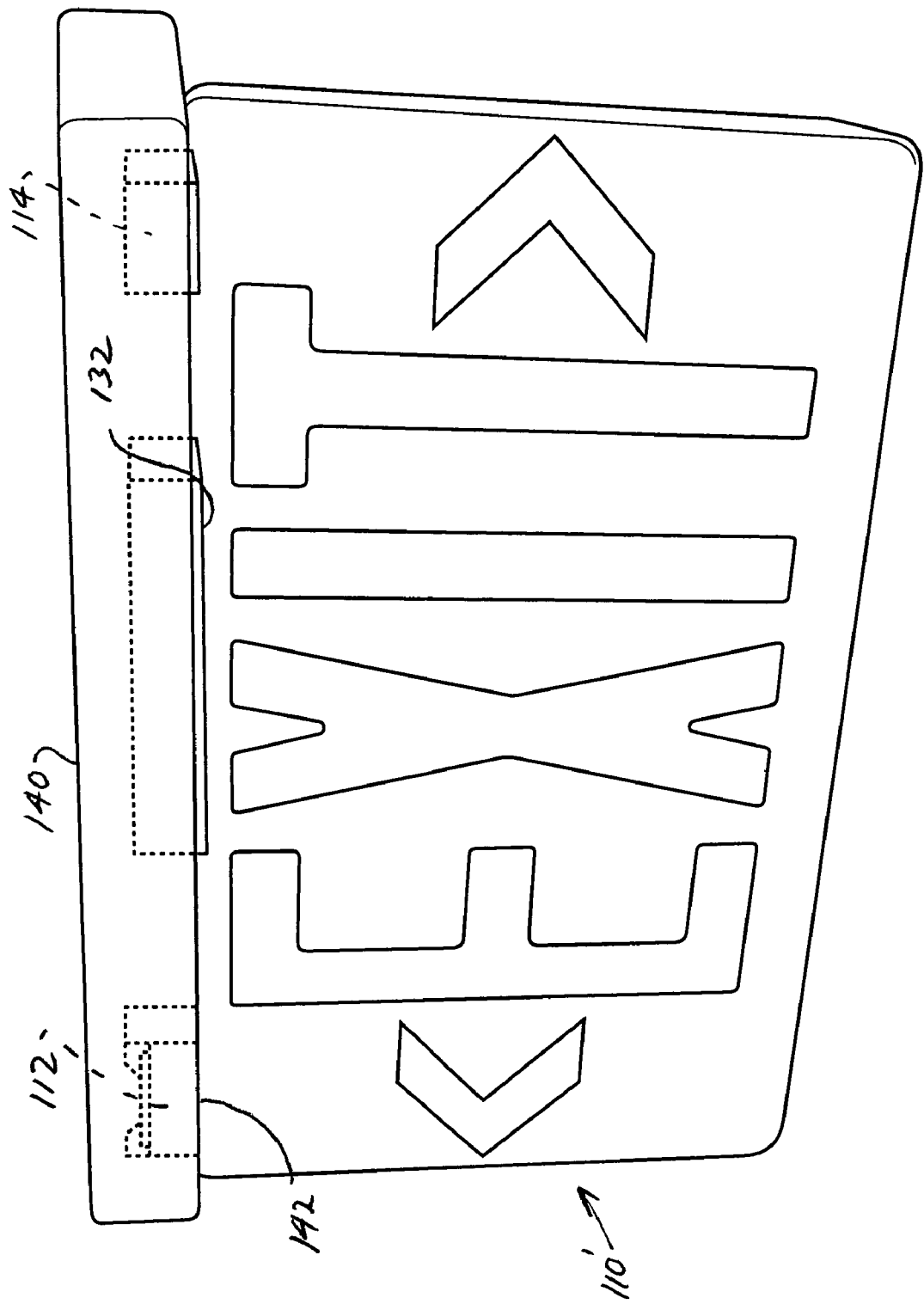
FIG. 16 a front perspective view of an embodiment similar to that of FIG. 15 but showing the emergency lights fixedly mounted to a support member for the emergency sign.

With reference to FIG. 16, a modification of the sign of FIGS. 15 and 17 is shown wherein the sign 110' is mounted to a ceiling mount 140. The configuration of the ceiling mount may vary as described with respect to the previous embodiments. In the current embodiment, the high power LED lamps 112 and 114, as previously described, are mounted to the lower wall 142 of the ceiling mount in front of the front face of the sign. In some variations of the present embodiment, two or more LED lamps 112 or 114 may be provided along the bottom wall on an opposite side of the sign. As previously described, generally either two or more LED lamps 112 or 114 will be used as opposed to a mix of LED lamps 112 and 114. With the present embodiment, the array of low power LEDs 130 are mounted within the lens 132.

Due to the embodiments of the invention that utilize a separate mounting member to suspend a sign housing when in use, for purposes of the attached claims, the term "housing" should be broadly interpreted as encompassing the mounting member.

The foregoing description of the present invention has been presented to illustrate the principles of the invention and not to limit the invention to the particular embodiments illustrated. It is intended that the scope of the invention be defined by all of the embodiments encompassed within the following claims and their equivalents.

I claim:

1. An emergency sign for use in buildings comprising; a housing having an interior and at least one side wall in which a message is provided and which message is normally illuminated with a plurality of message illuminating light emitting diodes mounted within the interior of said housing, chargeable backup batteries mounted within said housing, an electrical circuit for normally connecting said plurality of message illuminating light emitting diodes and said backup batteries to an AC source of power supply, said electrical circuit including means for electrically connecting said first plurality of message illuminating light emitting diodes in series with said backup batteries whenever said electrical circuit is receiving AC power input and also having means to automatically supply power from said backup batteries in parallel sets of said first plurality of message illuminating light emitting diodes whenever AC power to said electrical circuit is interrupted.

2. The emergency sign of claim 1 further including at least one emergency lighting lamp mounted to said housing for directing emergency light exteriorly from said housing, said at least one emergency lamp including at least one emergency light emitting diode for providing emergency lighting upon interruption of the AC power, said means for electrically connecting said first plurality of message illuminating light emitting diodes in series including means for blocking current to said at least one emergency light emitting diode whenever AC power is not interrupted, and said means to automatically supply power from said backup batteries in parallel to sets of said first plurality of message illuminating light emitting diodes whenever AC power to said electrical circuit is interrupted also supplying power to said at least one light emitting diode in parallel to said sets of said first plurality of message illuminating light emitting diodes.

3. The emergency sign of claim 2 including a test switch mounted to said housing which is engageable to open AC power to said plurality of message illuminating light emitting diodes and said backup batteries to thereby cause power to said message illuminating light emitting diodes and said at least one emergency light emitting diode to be generated by said backup batteries.

4. The emergency sign of claim 2 wherein said at least one emergency lighting lamp is mounted so as to be selectively seated within one wall of said housing or deployed outwardly and adjusted relative to said one wall of said housing.

5. The emergency sign of claim 4 including means for rotatably and pivotally mounting said at least one emergency lighting lamp to said one wall of said housing whereby the pivotal and rotatable mounting permits universal adjustment of said at least one emergency lighting lamp relative to said housing.

6. The emergency sign of claim 5 wherein said means for mounting includes a open tubular sleeve that is fitted within an opening in said one wall and in which said at least one emergency light lamp is seated when being seated with respect to said one wall of said housing.

7. The emergency sign of claim 5 wherein said housing includes a first thickness dimension between opposite sides thereof and said at least one emergency lighting lamp includes a lens that fits entirely within said first thickness dimension.

8. The emergency sign of claim 7 wherein said lens is generally circular in dimension having a diameter which is not greater than approximately one and one-half inch.

9. The emergency sign of claim 2 wherein said at least one emergency lighting lamp is mounted in fixed relationship to the sign so a to direct light therefrom downwardly from a downwardly oriented surface of the emergency sign.

10. The emergency sign of claim 2 wherein said at least one emergency lighting lamp includes a plurality light emitting diodes fixed to the sign so as to direct light therefrom from a downwardly oriented surface of the emergency sign.

11. The emergency sign of claim 2 wherein said at least one emergency lighting lamp includes a body pivotally mounted to a support that extends outwardly from a hollow swivel shaft that is adjustably mounted to the housing whereby the at least one emergency lamp is generally universal adjustable relative to said housing.

12. The emergency sign of claim 11 wherein said support is telescopically mounted to said housing.

13. An emergency sign for use in buildings comprising a housing having an interior and at least one side wall in which a message is provided and which message is normally illuminated with a plurality of message illuminating light emitting diodes mounted within the interior of said housing, an electrical circuit for normally connecting said plurality of message illuminating light emitting diodes to an AC source of power supply, at least one emergency lighting lamp mounted to said housing and including at least one emergency light emitting diode for providing emergency lighting upon loss of the AC power source, chargeable backup batteries mounted within said housing, said electrical circuit including means for electrically connecting said plurality of message illuminating light emitting diodes and said backup batteries to said AC source for illuminating said plurality of message illuminating light emitting diodes and for charging said backup batteries and also having means to automatically supply power from said backup batteries to said plurality of message illuminating light emitting diodes and said at least one light emitting diode whenever AC power to said electrical circuit is interrupted, said at least one emergency lighting lamp being at least partially selectively seated in a seated position within said housing or within a mounting member by way of which said housing is mounted to a wall or ceiling of a building, and said at least one emergency lighting lamp being selectively deployable outwardly relative to said seated position such that light therefrom may be selectively aimed.

14. The emergency sign of claim 13 including means for rotatably and pivotally mounting said at least one emergency lighting lamp to said housing or said mounting member.

15. The emergency sign of claim 14 wherein said housing includes a first thickness dimension between opposite sides thereof and said at least one emergency lighting lamp includes a lens that fits entirely within said first thickness dimension.

16. The emergency sign of claim 14 wherein said at least one emergency lighting lamp includes a plurality of low power light emitting diodes fixedly mounted to direct light therefrom from a bottom surface of one of said housing or said mounting member.

17. The emergency sign of claim 15 including at least two emergency lighting lamps mounted in spaced relationship to one of said housing or said mounting member.

18. The emergency sign of claim 15 wherein at least two emergency lamps are mounted within a bottom wall of said housing or said mounting member.

19. An emergency sign for use in buildings comprising; a housing with an interior and at least one side wall in which a message is provided and which message is normally illuminated with a plurality of message illuminating light emitting diodes mounted within the interior of said housing, at least one emergency lighting lamp mounted to said housing and including at least one emergency light emitting diode for providing emergency lighting upon loss of the AC power source, an electrical circuit for normally connecting said first plurality of message illuminating light emitting diodes to an AC source of power supply, chargeable backup batteries mounted within said housing, said electrical circuit including means for electrically connecting said plurality of message illuminating light emitting diodes and said backup batteries whenever said electrical circuit is receiving AC power input and also having means to automatically supply power from said backup batteries to said plurality of message illuminating light emitting diodes and said at least one light emitting diode whenever AC power to said electrical circuit is interrupted, and said at least one emergency lighting lamp being recessed within said housing in a first seated position thereof, such that the combination emergency sign and emergency light is compact to facilitate storage and shipment, and said at least one emergency lamp being pivotal outwardly and rotatable relative to said housing in order to direct light from said at least one emergency lamp when the combination emergency sign and emergency light is mounted for use.

20. The combination emergency sign and emergency light of claim 19 including at least two emergency lighting lamps and wherein said message illuminating light emitting diodes and said at least two emergency lighting lamps operate at under one volt.

\* \* \* \* \*